(12) United States Patent
Liu et al.

(10) Patent No.: US 7,079,403 B2
(45) Date of Patent: Jul. 18, 2006

(54) ISOLATED DC-DC CONVERTERS

(75) Inventors: Yan-Fei Liu, Kingston (CA); Sheng Ye, Kingston (CA)

(73) Assignee: Deen's University at Kingston, Kingston (CA)

( * ) Notice: Subject to any disclaimer, the term of this patent is extended or adjusted under 35 U.S.C. 154(b) by 0 days.

(21) Appl. No.: 10/729,970

(22) Filed: Dec. 9, 2003

(65) Prior Publication Data

US 2005/0024894 A1 Feb. 3, 2005

Related U.S. Application Data

(60) Provisional application No. 60/431,754, filed on Dec. 9, 2002.

(51) Int. Cl.
*H02M 3/335* (2006.01)

(52) U.S. Cl. .......................................... 363/16; 363/69

(58) Field of Classification Search .................. 363/15, 363/16, 17, 20, 21.04, 67, 69, 71
See application file for complete search history.

(56) References Cited

U.S. PATENT DOCUMENTS

| | | | |
|---|---|---|---|
| 4,695,933 | A | 9/1987 | Nguyen et al. |
| 5,875,103 | A | 2/1999 | Bhagwat et al. |
| 6,163,466 | A | 12/2000 | Davila, Jr. et al. |
| 6,388,898 | B1 | 5/2002 | Fan et al. |
| 6,392,902 | B1 | 5/2002 | Jang et al. |
| 6,469,915 | B1 | 10/2002 | Huang et al. |
| 6,757,184 | B1 * | 6/2004 | Wei et al. ...................... 363/71 |
| 2002/0118000 | A1 | 8/2002 | Xu et al. |
| 2004/0246748 | A1 * | 12/2004 | Xu et al. ...................... 363/17 |

OTHER PUBLICATIONS

Peng Xu, Fred C Lee, Jia Wei; The Coupled–Buck Converter for 12V VRM . . . ; VTIP Disclosure No.: 01–002; Virginia Tech Intellectual Properties, Inc.; Blacksburg, Virginia.

Albert M. Wu, Seth R. Sanders; An Active Clamp Circuit for Voltage Regulation Module . . . ; IEEE Transactions On Power Electronics, vol. 16 No. 5 Sep. 2001 pp. 623–624.

Yuri Panov, Milan M. Jovanovic; Design Considerations for 12–V/1.5V. 50A Voltage Regulator . . . ; IEEE Transactions On Power Electronics, vol. 16 No. 6 Nov. 2001 pp. 776–783.

INTEL; VRM 9.1 DC–DC Converter Design Guidelines; Intel Corporation; Order No. 298646–001; Jan. 2002.

(Continued)

*Primary Examiner*—Adolf Berhane
(74) *Attorney, Agent, or Firm*—Dowell & Dowell, P.C.

(57) ABSTRACT

One DC-DC converter includes primary side circuit between high and low side inputs including first primary winding of first transformer, and auxiliary section; and rectifier circuits, with separate secondary windings of first transformer, and in parallel with one another and output and capacitor; an output capacitor between outputs and across rectifier circuit. Auxiliary causes transfer of power from first primary to first secondary winding and operation without saturation. Another converter includes primary side circuit including primary winding of plurality of transformers, and an auxiliary section; a rectifier circuit having secondary winding of the plurality of transformers, the rectifier circuit in parallel with output and capacitor; an output capacitor between outputs and across rectifier circuit. Auxiliary section includes switches for connecting and disconnecting primary windings from input, and for resetting transformers. Alternatively, auxiliary section includes switches and capacitors. Switches and capacitors in auxiliary section shared between transformers.

52 Claims, 14 Drawing Sheets

OTHER PUBLICATIONS

INTEL; VRM 9.0 DC–DC Converter Design Guidelines; Intel Corporation; Order No. 249205–004; Apr. 2002.

Jinghai Zhou, Ming Xu, Fed C. Lee; A Novel Current–Tripler DC/DC Converter; Proceedings of IEEE 34th Annual Conference Power Electronics Specialist, vol. 3, 2003 pp. 1373–1378.

Jia Wei, Peng Xu, and Fred C. Lee, A High Efficiency Topology for 12V VRM–Push–Pull Buck and Its Integrated Magnetics Implementations, Virginia Polytechnic Institute and State University, 2002, pp. 689–695, IEEE: Blacksburg, VA, USA.

Peng Xu, Jia Wei, Kaiwei Yao, Yu Meng and Fred C. Lee, Investigation of Candidate Topologies for 12V VRM, Virginia Polytechnic Institute and State University, 2002, PP. 686–692, IEEE: Blacksburg, VA, USA.

Yan–Fei Liu, and Paresh C. Sen, New Class–E DC–DC Converter Topologies with Constant Switching Frequency, IEEE Transactions on Industry Applications, vol. 32, No. 4, Jul./Aug. 1996, pp.961–969, IEEE, USA.

Yan–Fei Liu, and Paresh C. Sen, A Novel Resonant Converter Topology for DC–to–DC Power Supply, IEEE Transactions on Aerospace and Electronic Systems, vol. 31, No. 4, Oct, 1995, pp. 1301–1313, IEEE, USA.

Yan–Fei Liu, and Paresh C. Sen, Source Reactance Lossless Switch (SRLS) for Soft–Switching Converters with Constant Switching Frequency, IEEE Transactions on Circuits and Systems –I: Fundamental Theory and Applications, vol. 43, No. 4, Apr. 1996, pp. 301–312, IEEE, USA.

* cited by examiner

ISOLATED DC-DC CONVERTERS

CROSS REFERENCE TO RELATED APPLICATIONS

This application claims priority from and is entitled to the benefit of the filing date of U.S. Provisional Patent Application No. 60/431,754 filed 9 Dec. 2002 under the same title and by the same inventors.

FIELD OF THE INVENTION

The invention relates to DC-DC converters. More particularly, it relates to such converters that require electrical isolation between the input voltage and output load, and that are employed for low output voltage, high current applications such as central processing unit (CPU) for computer and for communication equipment.

BACKGROUND OF THE INVENTION

Computers are widely used both in our personal life and in our work. The heart of the computer is the central processing unit (CPU), which performs all the numerical calculation needed for today's ever demanding operation. In order to increase the calculation speed of the CPU, and, thus the speed of the computer, the voltage required to power the CPU is becoming lower and lower. At the same time, the current that the CPU draws is becoming higher and higher. For example, the next generation CPU will require supply voltage of less than 1V and current of more than 100 A. The current view is that the required CPU supply voltage is from 0.8V to 1.6V for the next generation CPU.

For the CPU in a high-end server, the type of computer used to direct our Internet traffic and data transfer, the CPU's current requirement is even larger. The current for a server CPU could be up to 500 A.

As an example, in a personal computer, power is typically drawn from a 120V AC wall outlet. This AC voltage is converted into a 12V DC voltage by an AC-to-DC converter. The 12V DC is distributed to a motherboard where the CPU is located. This 12V DC voltage cannot power the CPU directly. A DC-DC converter (often referred to as a voltage regulator module or VRM) is used to convert the 12V DC into the lower voltage required by the CPU. This power system architecture is currently preferred from a performance and cost point of view.

Another requirement of CPU powering is fast dynamic response. During a time when little calculation is required, the CPU will draw very low current. For a time when a lot of calculation is required, the CPU will draw large current. The transition between the low current and large current is very fast. The current change rate can be as high as 10,000 A per microsecond. Therefore, the converter should have very fast dynamic response to meet this requirement.

If the response speed of the converter is not fast enough, the voltage across the CPU will have significant overshoot during the transition from large CPU current to low CPU current because an inductor is typically used in the converter. This voltage overshoot could cause damage to the CPU. Similarly, the voltage across the CPU will have significant undershoot during the transition from low CPU current to large CPU current. If the voltage is too low, the CPU may not operate properly.

In addition, the power loss for the converter should be small in order to reduce the temperature rise of the semiconductors used to implement the converter.

Referring to FIG. 1, a Buck converter is typically used to convert incoming 12V into low output voltage such as 1.5V.

The output voltage of a Buck converter is calculated as:

$$Vout = D * Vin$$

Where Vout is the output voltage and Vin is the input voltage. D is the duty cycle and is defined as:

$$D = Ton/Ts$$

Where Ton is the time period during which the top switch Q1 is conducting, and Ts is the switching period of Q1.

In order to achieve Vin=12V to Vout=0.8V conversion, the required duty cycle for a Buck converter is D=0.8/12= 7%. It is noted that a small duty cycle such as 7% is not optimal for the design and operation of a Buck converter when the switching time of the MOSFET ("metal-oxide semiconductor field-effect transistor") is considered. For example, for a typical MOSFET, the turn on time is around 50 ns and the turn off time is around 100 ns. This means that the MOSFET will be conducting for at least 150 ns regardless of the control signal. If we assume the switching frequency is 300 KHz, the switching period is 3.33 µs. The switching time of 150 ns is equivalent to 150 ns/3.33 µs=4.5%. This means that we only have control of about 2.5% (7%-4.5%) of conducting time of the MOSFET. Considering the delay time of the controller, it is very difficult to design in actual implementation. The compromise is to reduce the switching frequency to a lower level, such as 200 KHz. However, lower switching frequency will also lower the dynamic response, which is a very important performance measurement for DC-DC converters.

In addition, operating at a very small duty cycle has another detrimental impact to the dynamic response. During the transition from low CPU current to high CPU current, the inductor current should be ramped up. This can be done by increasing the duty cycle from 7% (take the above example) to 100% (maximum). The duty cycle has 93% change, which is very beneficial to handle this transition. However, during the transition from high CPU current to low CPU current, the inductor current should be ramped down. The only way to achieve this is to reduce the duty cycle. Nevertheless, the duty cycle can only be reduced from 7% to 0%. The duty cycle has only 7% change, which results in poor dynamic response.

To improve the dynamic response point of view, it is desirable to select higher switching frequency for the converter. It is also desirable for the converter to operate at around a 50% duty cycle.

Referring to FIG. 2, in order to improve dynamic response an interleaved Buck converter can be used, such as a four-phase interleaved Buck converter. By interleaving, the equivalent ripple frequency is four times the switching frequency of each phase. For example, if the switching frequency of each Buck converter is 200 KHz, the equivalent switching frequency for four-phase interleaved Buck converter will be 800 KHz. Another benefit of interleaving is that the ripple current through the output capacitor and input capacitor is also significantly reduced. However, each Buck converter still operates at very small duty cycle, which is not desirable.

In computer and communications applications DC-DC converters may be used to perform various conversions. Some standard conversion applications include approximately 400V DC to 48V DC (e.g., DC stage of AC-DC rectifiers for communication power plant), 48V DC to 0.8–5V DC (communications equipment), 48V DC to 0.8–1.6V DC (CPU), and 48V DC to 24 or 12V DC (intermediate voltage bus, or wireless systems). In higher load current applications, electrical isolation between the input voltage and output load may be required for safety reasons.

SUMMARY OF THE INVENTION

In a first aspect the invention provides an isolated DC-DC converter for use with a DC power source having a DC voltage across a first voltage source output and a second voltage source output and with a load. The converter includes an input for accepting the DC voltage, the input having a first voltage input and a second voltage input, and an output for outputting a converted DC voltage, the output having a first voltage output and a second voltage output. It also includes a primary side circuit connected between the first voltage input and the second voltage input including a first primary winding of a first transformer and an auxiliary section, a plurality of rectifier circuits, each rectifier circuit having a separate secondary winding of the first transformer, the rectifier circuits connected in parallel with one another and with the output, and an output capacitor connected between the first voltage output and the second voltage output and across the rectifier circuit. An output converted DC voltage between the first voltage output and the second voltage output has the same polarity as a DC voltage input between the first voltage input and the second voltage input. The auxiliary section is for causing the first transformer to transfer power from the first primary winding to the first secondary winding and to operate without saturation. The rectifier circuit is for converting output of the first secondary winding into a one-direction waveform and converting the one-direction waveform into a DC voltage. The output capacitor is for filtering the converted DC voltage.

The plurality of rectifier circuits may include only first and second rectifier circuits.

In a second aspect the invention provides an isolated DC-DC converter for use with a DC power source having a DC voltage across a first voltage source output and a second voltage source output and with a load. The converter includes an input for accepting the DC voltage, the input having a first voltage input and a second voltage input, and an output for outputting a converted DC voltage, the output having a first voltage output and a second voltage output. It also includes a primary side circuit connected between the high side input and the low side input including a primary winding of each of a plurality of transformers, and an auxiliary section, a rectifier circuit having a secondary winding for each of the plurality of transformers, the rectifier circuit connected in parallel with the output, and an output capacitor connected between the first voltage output and the second voltage output and across the rectifier circuit. An output converted DC voltage between the first voltage output and the second voltage output has the same polarity as a DC voltage input between the first voltage input and the second voltage input. The auxiliary section is for causing the transformers to transfer power from the primary windings to the secondary windings and to operate without saturation, and the auxiliary section includes switches for repeatedly connecting and disconnecting the primary windings from the input, and for resetting the transformers. A plurality of the switches in the auxiliary section are shared between transformers. The rectifier circuit is for converting output of the secondary windings into a one-direction waveform and converting the one-direction waveform into a DC voltage. The output capacitor is for filtering the converted DC voltage.

The rectifier circuit may have a plurality of switches for performing the conversion of output of the secondary winding into a one-direction waveform, and wherein a plurality of the switches of the rectifier circuit are shared between the secondary windings of the transformers.

The transformer primary windings of the plurality of transformers may be connected one to the next in a ring.

In a third aspect the invention provides an isolated DC-DC converter for use with a DC power source having a DC voltage across a first voltage source output and a second voltage source output and with a load. The converter includes an input for accepting the DC voltage, the input having a first voltage input and a second voltage input, and an output, the output having a first voltage output and a second voltage output. It also includes a primary side circuit connected between the first voltage input and the second voltage input including a primary winding of each of a plurality of transformers, and an auxiliary section, a rectifier circuit having a secondary winding for each of the plurality of transformers, the rectifier circuit connected in parallel with the output, and an output capacitor connected between the first voltage output and the second voltage output and across the rectifier circuit. An output converted DC voltage between the first voltage output and the second voltage output has the same polarity as a DC voltage input between the first voltage input and the second voltage input. The auxiliary section is for causing the transformers to transfer power from the primary windings to the secondary windings and to operate without saturation, and the auxiliary section includes a combination of switches and capacitors for repeatedly connecting and disconnecting the primary windings from the input, and for resetting the transformers. The combination of switches and capacitors in the auxiliary section is shared between transformers. The rectifier circuit is for converting output of the secondary windings into a one-direction waveform and converting the one-direction waveform into a DC voltage. The output capacitor is for filtering the converted DC voltage.

The rectifier circuit may have a plurality of switches for performing the conversion of output of the secondary windings into a one-direction waveform, and wherein a plurality of the switches of the rectifier circuit are shared between the secondary windings of the transformers.

The converters may have primary switches that have input for gate drive signals for operating the primary windings out of phase with one another. The converters of the first and second aspects may have an auxiliary section that includes four switches. Each switch may be a MOSFET.

The auxiliary section of the first aspect may have a first switch connected between a first side of the first primary winding and the first voltage input, a second switch connected between a second side of the first primary winding and the first voltage input, a third switch connected between the first side of the first primary winding and the second voltage input, and a fourth switch connected between the second side of the first primary winding and the second voltage input.

Each switch may have an input for a gate drive signal for controlling the operation of the switch. The gate drive signals may repeatedly turn on and turn off the first and fourth switch. The gate drive signals may repeatedly turn on and turn off the second and third switches whereby the first transformer can be reset.

Alternatively, the auxiliary section may have a first switch connected between a first side of the first primary winding and the first voltage input, a first capacitor connected between a second side of the first primary winding and the first voltage input, a second switch connected between the first side of the first primary winding and the second voltage input, and a second capacitor connected between the second side of the first primary winding and the second voltage input. Each switch may have an input for a gate drive signal for controlling the operation of the switch. The gate drive signals may be adapted to repeatedly turn on and turn off the first switch and repeatedly turn on and turn off the second switch whereby the first transformer can be reset from the capacitors. The capacitors may be large enough that the voltage across the capacitors will not change significantly during normal operation of the converter.

In the first aspect, the rectifier circuit may have a combination of inductors and switches, wherein the switches are for converting alternating voltage in the first secondary winding into pulsating one-direction voltage and the inductors are for converting pulsating one-direction voltage into DC voltage.

Alternatively, the rectifier circuit may have a combination of inductors and diodes, wherein the diodes are for converting pulsating alternating voltage in the first secondary winding into pulsating one-direction voltage and the inductors are for converting pulsating one-direction voltage into DC voltage.

In the second or third aspect, the rectifier circuit may have a first rectifier switch connected between the second voltage output and a first side of the first secondary winding, a second rectifier switch connected between a second side of the first secondary winding and the second voltage output, a first inductor connected between the first side of the first secondary winding and the first voltage output, and a second inductor connected between the second side of the first secondary winding and the first voltage output.

Again, each switch may have an input for a gate drive signal for controlling the operation of the switch. The gate drive signals may be adapted to switch the first and second rectifier switches to convert pulsating alternating voltage at the first secondary winding into one-direction pulsating voltage.

Alternatively, the rectifier circuit may have a first rectifier switch connected between the second voltage output and a first side of the first secondary winding, a second rectifier switch connected between a second side of the first secondary winding and the second voltage output, and a first inductor connected between the first side of the first secondary winding and the first voltage output not in series with the second rectifier switch.

Alternatively, the rectifier circuit may have first and second rectifier diodes and a first inductor, and the first diode is connected between a first side of the first secondary winding and the first inductor, and the inductor is further connected between the first diode and the first voltage output, for forward conduction from the secondary winding through the inductor, and the second diode is connected between (a) a point between the second side of the first secondary winding and the second voltage output and (b) a point between the first inductor and first diode, also for forward conduction from the secondary winding through the inductor.

Alternatively, the rectifier circuit may have a second secondary winding, first and second rectifier diodes and a first inductor, and a second side of the first secondary winding is connected to a first side of the second secondary winding and the second voltage output, and the first diode is connected between a first side of the first secondary winding and the first inductor, and the inductor is further connected between the first diode and the first voltage output, for forward conduction from the secondary winding through the inductor, and the second diode is connected between (a) the second side of the second secondary winding and (b) a point between the first inductor and first diode, also for forward conduction from the secondary winding through the inductor.

Alternatively, the rectifier circuit may have a second secondary winding, first and second rectifier switches and a first inductor, and a second side of the first secondary winding is connected to a first side of the second secondary winding and the inductor which is further connected to the first voltage output, and the first rectifier switch is connected between a first side of the first secondary winding and the second voltage output, and the second rectifier switch is connected between a second side of the second secondary winding and the second voltage output.

The first and second rectifier switches, the first secondary winding and the first and second inductors may be included within a first rectifier section, and the rectifier circuit may include a second rectifier section similar to the first rectifier section, and the first and second rectifier sections are connected in parallel with one another and with the output capacitor and the output.

The first and second diodes, the first secondary and second secondary windings and the inductor may be included within a first rectifier section, and the rectifier circuit may also include a second rectifier section similar to the first rectifier section, and the first and second rectifier sections are connected in parallel with one another and with the output capacitor and the output.

The first and second rectifier switches, the first secondary and second secondary windings and the inductor may be included within a first rectifier section, and the rectifier circuit may include a second rectifier section similar to the first rectifier section, and the first and second rectifier sections are connected in parallel with one another and with the output capacitor and the output.

In the second aspect, the plurality of transformers may be a first and a second transformer and wherein the primary side primary windings consist of a first primary winding of the first transformer and a second primary winding of the second transformer, and the plurality of switches of the auxiliary section may be a first switch connected between a first side of the first primary winding and the first voltage input, a second switch connected between a second side of the first primary winding and the first voltage input, a third switch connected between the first side of the first primary winding and the second voltage input, and a fourth switch connected between the second side of the first primary winding and the second voltage input, and a fifth switch connected between the first voltage input and a first side of the second primary winding, and a sixth switch connected between the first side of the second primary winding and the second voltage input, and a second side of the second primary is connected to a side of the first primary winding.

The second primary switches may have input for gate drive signals for operating the second primary winding out of phase with the first primary winding. The plurality of transformers may be a first, second, and third transformer and wherein the primary side primary windings consist of a first primary winding of the first transformer and a second primary winding of the second transformer and a third primary winding of the third transformer, and the plurality of switches of the auxiliary section consist of a first switch connected between a first side of the first primary winding and the first voltage input, a second switch connected between a second side of the first primary winding and the first voltage input, a third switch connected between the first side of the first primary winding and the second voltage input, and a fourth switch connected between the second side of the first primary winding and the second voltage input, and a fifth switch connected between the first voltage input and a first side of the second primary winding, and a sixth switch connected between the first side of the second primary winding and the second voltage input, and a second side of the second primary is connected to a side of the first primary winding, the third transformer connected between the first side of the first primary winding and the second side of the second primary winding.

In the second aspect, the plurality of transformers may be a first, second, and third transformer and wherein the primary side primary windings may be a first primary winding of the first transformer and a second primary winding of the second transformer and a third primary winding of the third transformer, and the plurality of switches of the auxiliary section may be a first switch connected between a first side of the first primary winding and the first voltage input, a second switch connected between a second side of the first primary winding and the first voltage input, a third switch connected between the first side of the first primary winding and the output, and a fourth switch connected between the second side of the first primary winding and the second voltage input, and a fifth switch connected between the first voltage input and a first side of the second primary winding, and a sixth switch connected between the first side of the second primary winding and the second voltage input, and a second side of the second primary is connected to a side of the first primary winding, a first side of the third primary winding connected to the second side of the second primary winding, and a seventh primary switch connected between a second side of the third primary winding and the first voltage input, and an eighth primary switch connected between the second side of the third primary winding and the second voltage input.

The primary switches may have input for gate drive signals for operating the primary windings out of phase with one another, and no additional drive components are added for the third primary.

For the converters the input voltage may be approximately 48 volts DC and the output voltage may be within a range of 0.8 volts DC to 1.6 volts DC, the input voltage may be approximately 48 volts DC and the output voltage may be within a range of 0.8 volts DC to 5 volts DC, the input voltage may be approximately 48 volts DC and the output voltage may be approximately 24 volts DC or 12 volts DC, or the input voltage may be approximately 400 volts DC and the output voltage may be approximately 48 volts DC. It is noted that other input and output voltage levels can also be implemented by choosing the turns ratio properly.

In the first aspect and in any other converter having two or fewer transformers the duty cycle of each transformer may be between 40% and 60%. The duty cycle of each transformer may be approximately 50%. This is the preferred duty cycle for the transformers in these converters.

In any converter having only three transformers, the duty cycle of each transformer may be approximately 33⅓%. This is the preferred duty cycle for the transformers in these converters.

A fourth aspect includes a method of operating the converters of any one of the above aspects by driving the auxiliary section to cause the first transformer to transfer power from the first primary winding to the first secondary winding, while at the same time driving the auxiliary section to cause the transformer to operate without saturation.

Other aspects of the invention, including further methods employing converters, will be evident from the figures and detailed description herein.

BRIEF DESCRIPTION OF THE DRAWINGS

For a better understanding of the present invention and to show more clearly how it may be carried into effect, reference will now be made, by way of example, to the accompanying drawings which show the preferred embodiment of the present invention and in which.

DETAILED DESCRIPTION OF THE PREFERRED EMBODIMENT

Some embodiments of a family of isolated DC-DC converters that are suitable for a variety of existing applications for isolated DC-DC converters, such as those mentioned in the Background section of this description, will be described. In addition, multi-phase interleaved converters will be described to further improve performance.

The converters can be used for the next generation voltage regulator module (VRM) to meet the stringent power requirement of the next generation CPU. The converters can have high efficiency and fast dynamic response, and can provide high current to the CPU. They can also be used for other applications, such as in a communication system where similar performance is needed.

Several novel isolated DC converters based on full-bridge converters will now be described.

Figure 1:
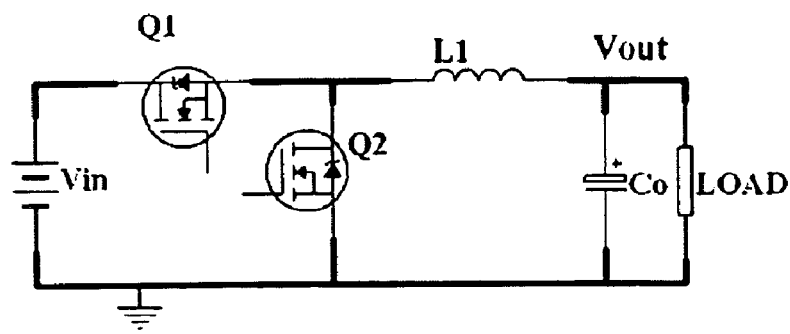
FIG. 1 is a schematic diagram of a Buck converter of known configuration.
Figure 2:
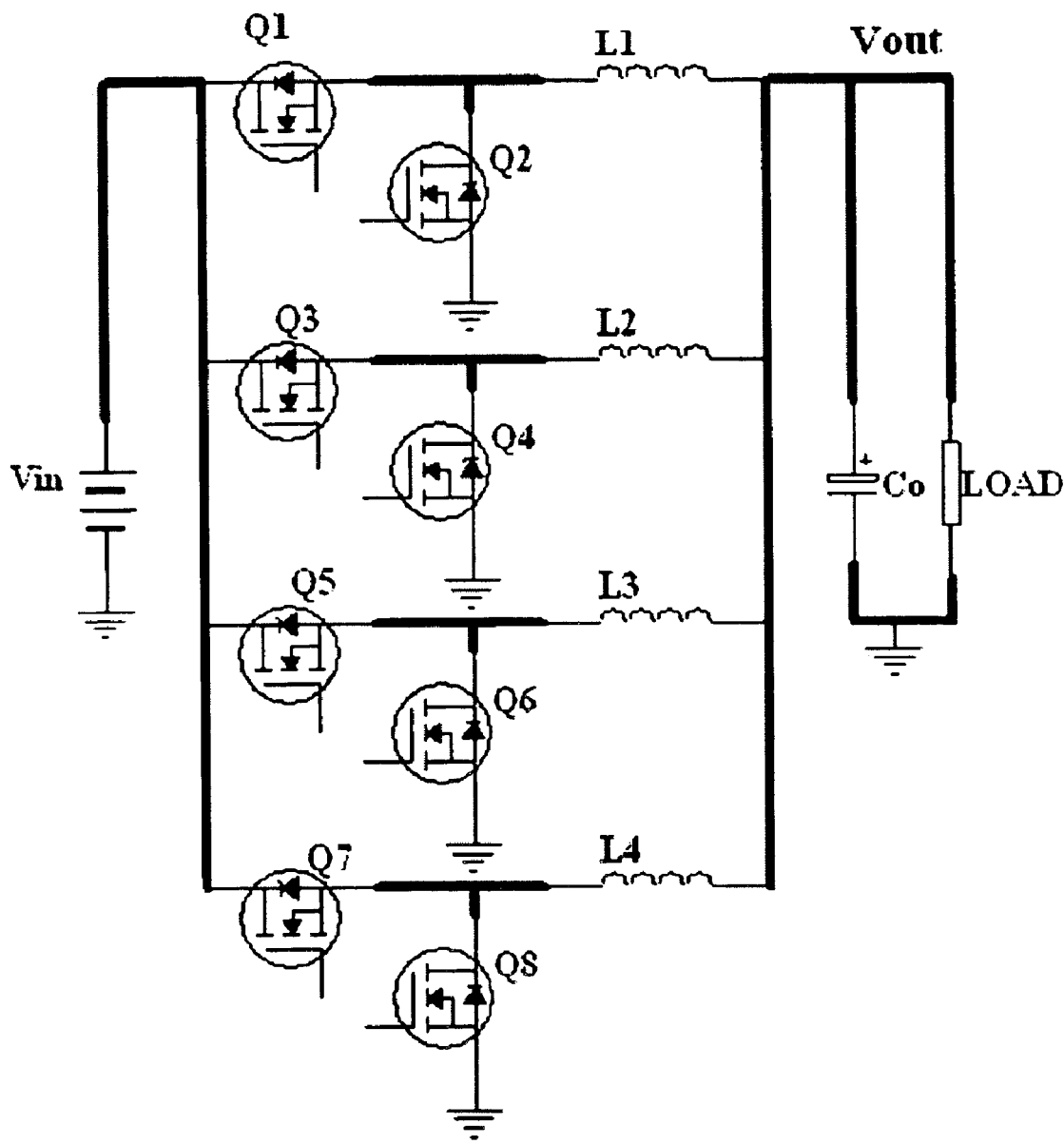
FIG. 2 is a schematic diagram of a four-phase interleaved Buck converter of known configuration.
Figure 3:
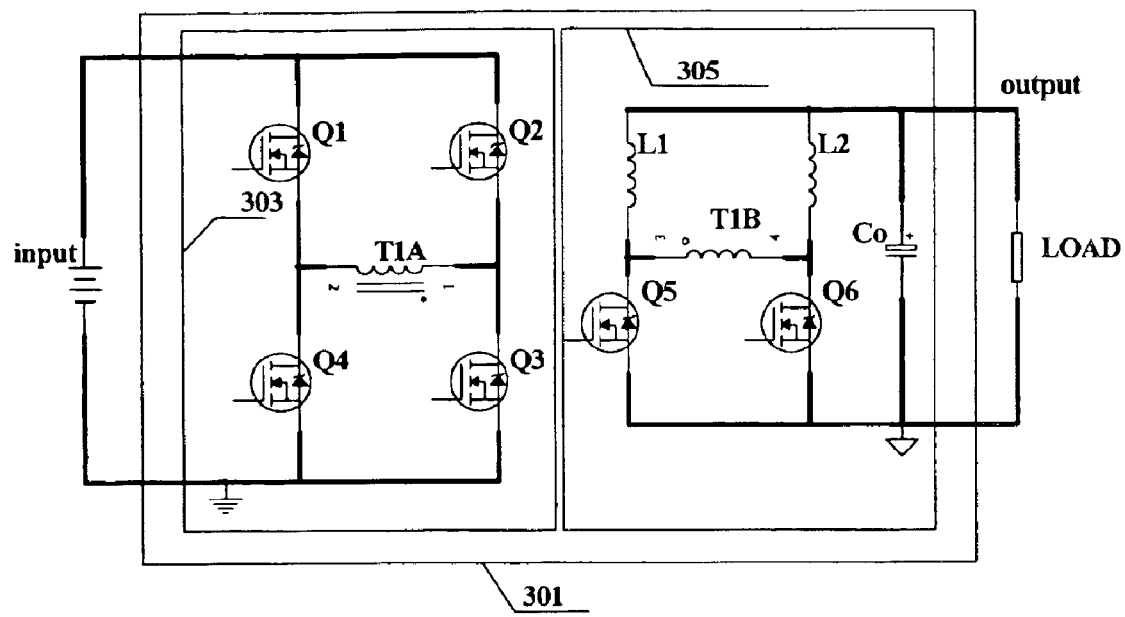
FIG. 3 is a schematic diagram of an isolated single phase full-bridge converter of known configuration.

Referring to FIG. 3, isolated full-bridge converter 301 of known configuration has a primary side 303 and secondary side 305. The primary side 303 includes one or more transformer primary winding(s) and an auxiliary section that will operate the transformer(s) properly. The auxiliary section may consist of switches (such as MOSFET, BJT ("bipolar junction transistor"), etc). The auxiliary section may also consist of a combination of switches and capacitors. The function of the auxiliary section is to make the transformer(s) operate properly. The term "operate properly" means that the transformer(s) will not saturate and the power can be transferred from each primary winding to its secondary winding(s) efficiently. Various examples of auxiliary sections, such as full-bridge and half-bridge, will be described herein.

The primary side 303 consists of the auxiliary section (Q1, Q2, Q3, and Q4 combined), and transformer primary winding T1A. The secondary side 305 consists of Q5, Q6, transformer secondary winding T1B, and inductors L1, L2. By changing the duty cycle of the primary switches Q1–4, the output voltage Vout+ can be regulated. The secondary side 305 is a "current doubler circuit". Other types of known secondary circuits can be used, as will be evident to those skilled in the art using the principles described herein.

One problem is that for higher load current, the power loss in the secondary side 305 is very high. More specifically, the conduction loss of Q5 and Q6 is very high.

Also the converter 301 has higher input ripple current. This requires a larger capacitor, not shown, to filter out the ripple current in order to meet EMI (electro-magnetic interference) requirements.

Figure 4:
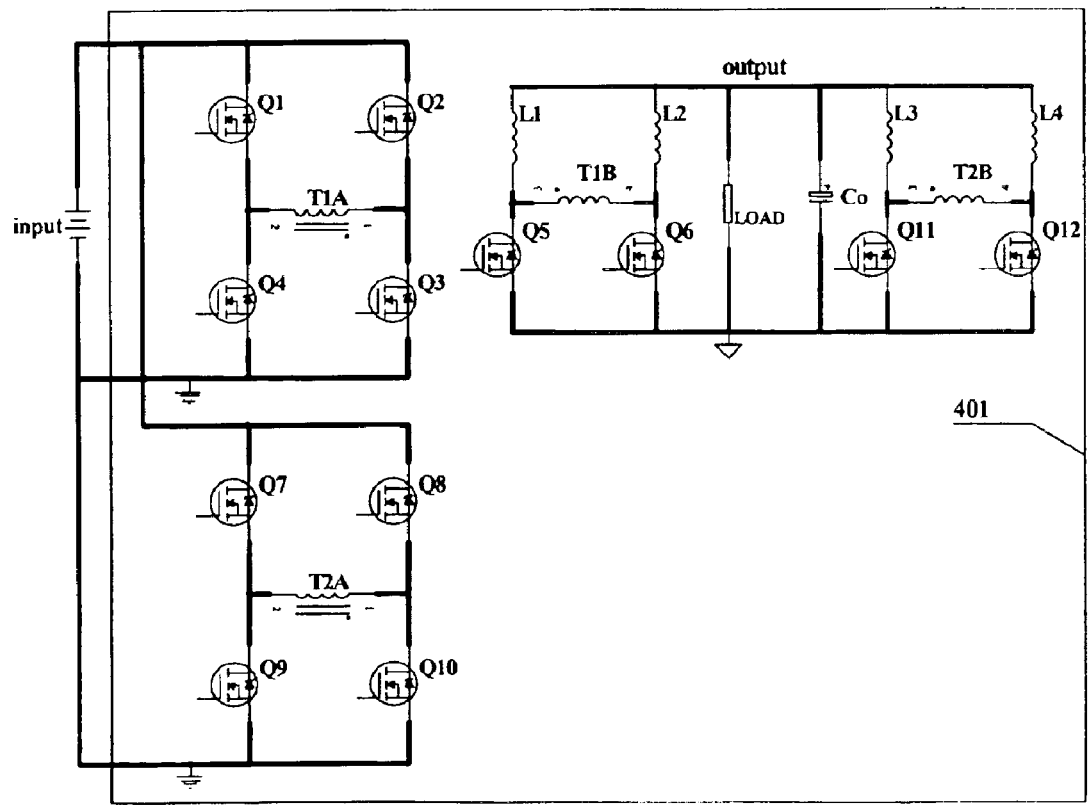
FIG. 4 is a schematic diagram of a two-phase interleaved full-bridge DC converter of known configuration.

Referring to FIG. 4, as is known, two full-bridge converters can be connected in parallel to create converter 401. Converter 401 is operated in interleaved mode in order to solve the above-mentioned problems, i.e., to reduce the power loss in the secondary side and to reduce the input current ripple.

Figure 5:
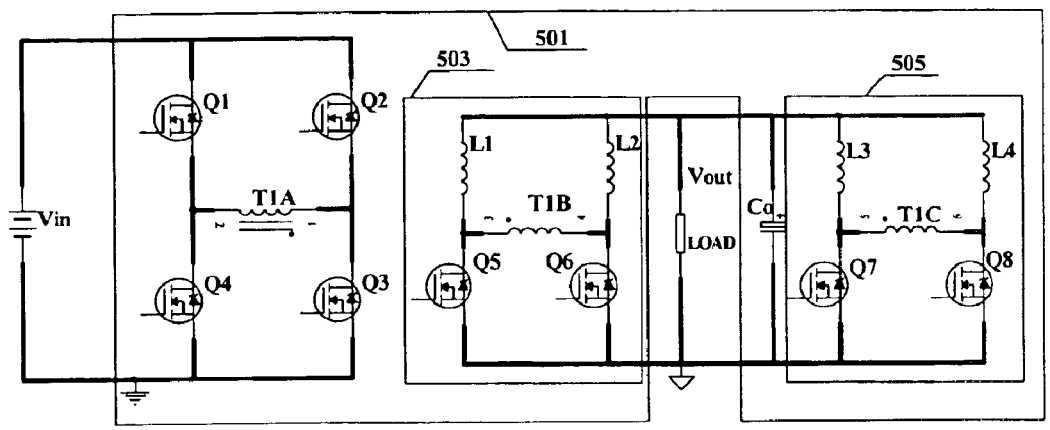
FIG. 5 is a schematic diagram of a full-bridge DC converter with parallel rectifier circuits in accordance with a preferred embodiment of the present invention.

Referring to FIG. 5, full-bridge DC converter 501 has parallel rectifier circuits 503, 505 to reduce current loss. Each rectifier circuit 503, 505 consists of one transformer secondary winding T1B, T1C, two MOSFETs Q5, Q6 and Q7, Q8 and two inductors L1, L2 and L3, L4. When handling similar power the converter 501 will have higher efficiency than the converter 301 in FIG. 3 because the conduction loss is lower for the converter 501. The two windings T1B, T1C are coupled with the primary winding T1A. Using this method the load current is shared between two secondary windings T1B, T1C. As we know the conduction loss is $I^2 R$; if the resistance is not changed, and the current becomes half, the conduction losses will be half. This is more effective than paralleling two switches to reduce conduction losses when parasitic components are considered.

In converter 501, two rectifiers 503, 505 connected in parallel are shown. In actual implementation, three or more rectifier circuits can be connected in parallel to share the load current. The detailed circuits will be evident to those skilled in the art using the principles described herein, and there implementation will not be further described.

It is to be noted that typical implementations will have the high side voltage as a positive voltage and the low side voltage as a negative voltage. It is possible to provide converters embodying the principles described herein where the high side voltage is negative with respect to the low side voltage. Thus, the voltage inputs to the converters could simply be a first voltage and a second voltage, rather than always being positive and negative DC voltages (or "potentials") with the positive voltage always being the input voltage to the high side circuit. Similarly, the output voltage of the converter could be first and second DC voltages, rather than requiring the converter output that receives current from the high side circuit to be a positive voltage when compared to the other converter output. In any case the output converter DC voltage between the first voltage and the second voltage has the same polarity as a DC voltage input between the first voltage and the second voltage.

Figure 6:
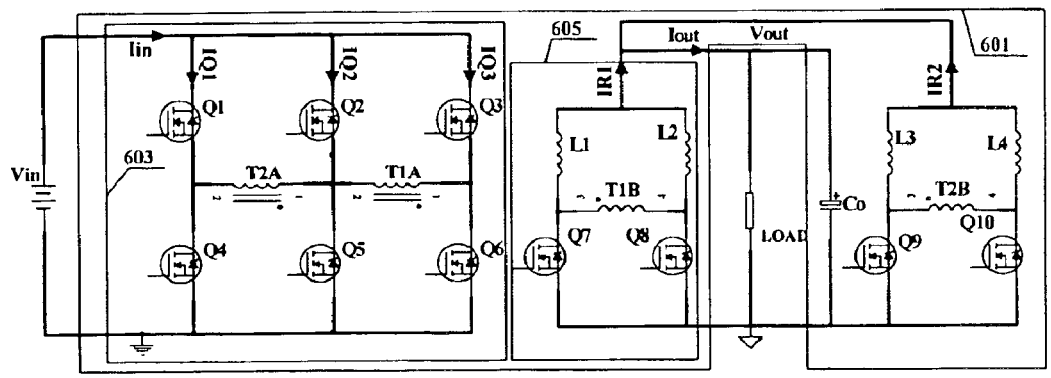
FIG. 6 is a schematic diagram of a two-phase interleaved full-bridge converter with shared primary switch in accordance with a preferred embodiment of the present invention.

Referring to FIG. 6, in two-phase interleaved full-bridge converter 601 with shared primary switches, the primary side 603 requires only six MOSFETs Q1–6, instead of eight for the converter 401 shown in FIG. 4. However, the input current ripple and output current ripple are similar for the converter 601 as compared to the converter 401 when using similar drive schemes.

Figure 7:
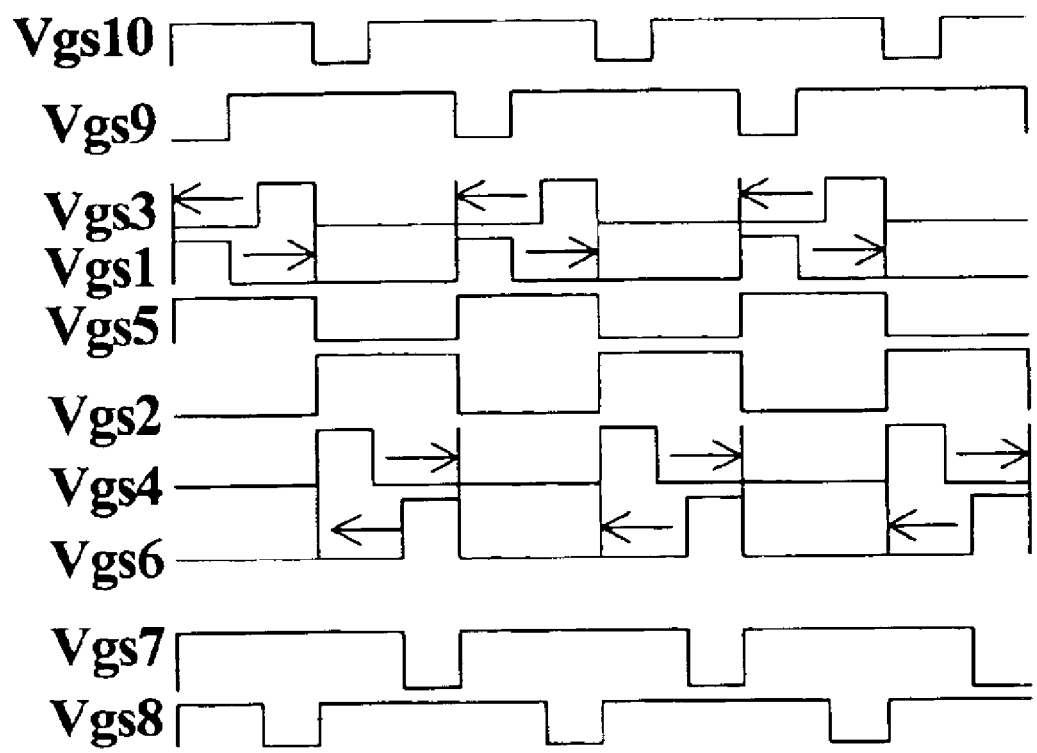
FIG. 7 is a graphic illustration of a gate drive scheme for the two-phase interleaved full-bridge converter with shared primary switch embodiment shown in FIG. 6.
Figure 8:
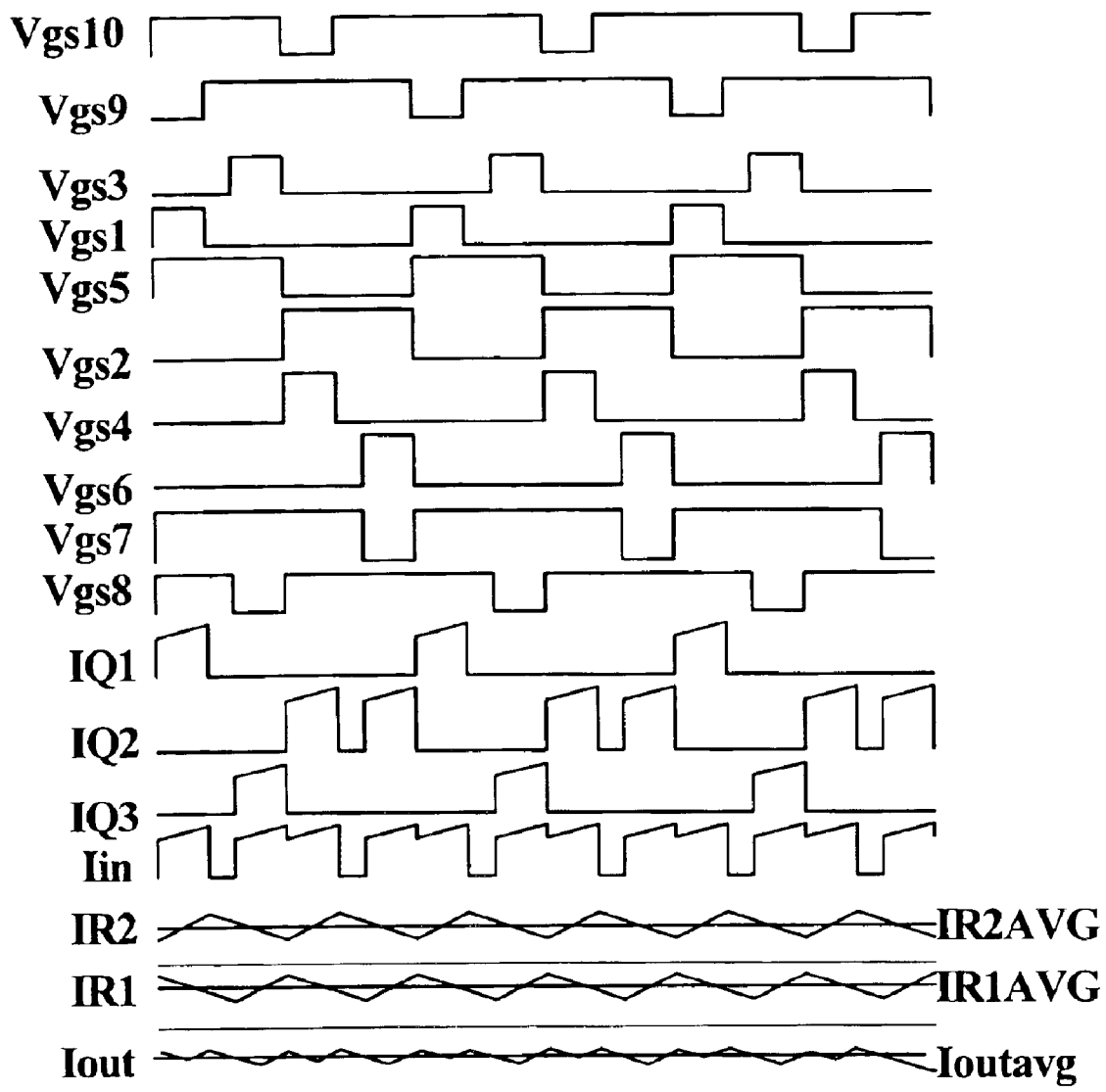
FIG. 8 is a graphic illustration of gate drive signals and input and output current waveforms for the two-phase interleaved full-bridge converter with shared primary switch embodiment shown in FIG. 6 with a duty cycle of 40%.

Referring to FIG. 7, an improved gate drive scheme for two-phase interleaved full-bridge converter 601 with shared primary switch is shown. FIG. 8 shows the related current waveforms.

Q2 and Q5 work out of phase with each other. Q2 is on for the first half switching period, and Q5 is on for next half switching period. Q1 and Q3 are phase-shifted from each other. Note that in the control logic above, the move direction of Q1 and Q3 are different from conventional phase shift control. Q1 is turned on when Q5 is turned on. By changing the turn off time, the duty cycle of Q1 is controlled. Q3 is turned off when Q5 is turned off. By changing the turn on time, the duty cycle of Q3 is controlled.

Q4 and Q6 work in the same way as Q1 and Q3.

For synchronous rectifiers, Q7 is driven by the complementary signal of Q6. Q8 is driven by the complementary signal of Q3. Q9 is driven by the complementary signal of Q1. Q10 is driven by the complementary signal of Q4. The gate drive signals are shown in FIGS. 7 and 8.

The input and output current waveforms show that the input current ripple and the output current ripple can be reduced significantly.

Figure 9:
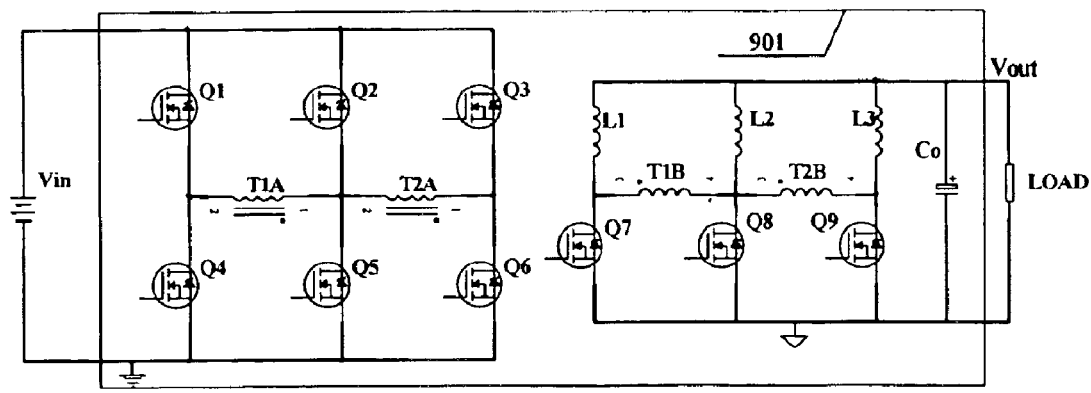
FIG. 9 is a schematic diagram of a two-phase interleaved full-bridge converter with shared primary switch and shared secondary switch in accordance with a preferred embodiment of the present invention.

Referring to FIG. 9, the rectifier switches for the converter 601 in FIG. 6 can also be shared to derive converter 901. In the converter 901, three MOSFETs are needed for the secondary side switches Q7–9.

Figure 10:
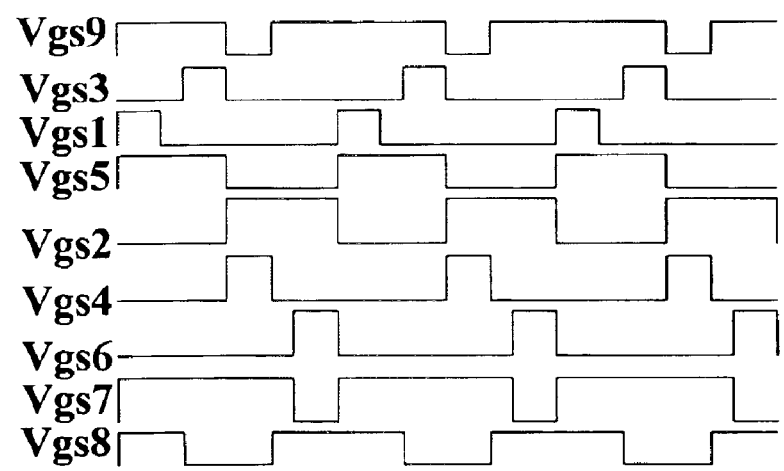
FIG. 10 is a graphic illustration of gate drive signals for the converter of FIG. 9.

Referring to FIG. 10, a gate drive scheme for all the nine switches Q1-9 of converter 901 is shown. The gate drive signals for the primary side MOSFETs Q1–6 are the same as those for converter 601 of FIG. 6. For synchronous rectifier switches, Q7 is off when Q2 and Q6 are on. Q8 is off when Q3 and Q5 or Q1 and Q5 are on. Q9 is off when Q2 and Q4 are on.

Using the principles discussed with respect to converters 601 and 901 of FIG. 6 and FIG. 9, respectively, three-phase interleaved full-bridge converters with shared switches will now be described.

Figure 11:
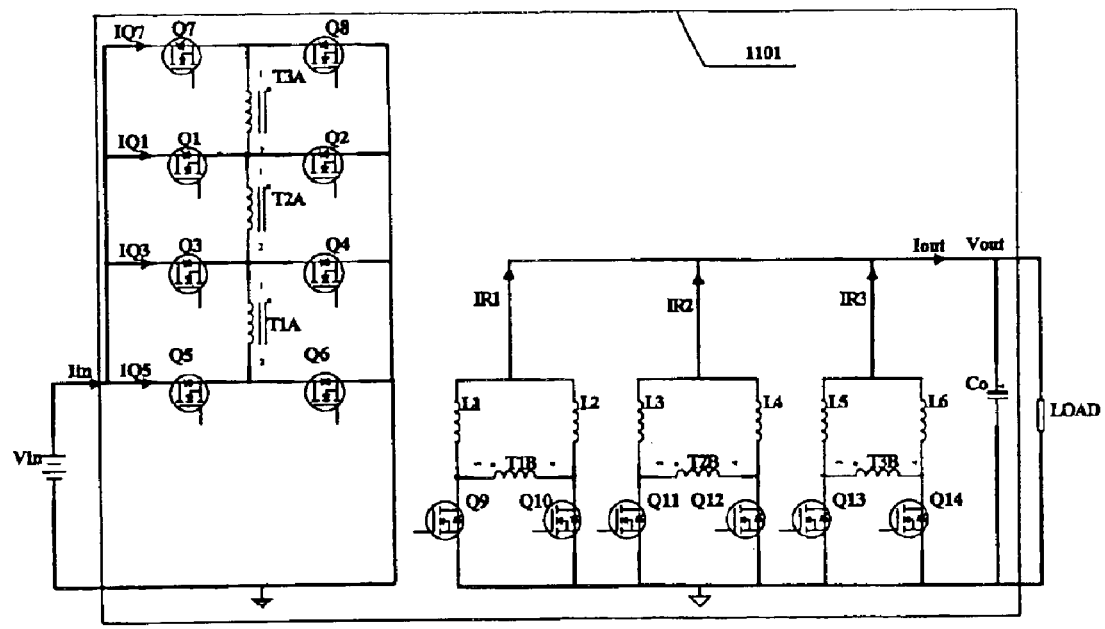
FIG. 11 is a schematic diagram of a three-phase interleaved full-bridge converter with shared primary switch in accordance with a preferred embodiment of the present invention.

Referring to FIG. 11, using shared switches a three-phase interleaved full-bridge DC converter 1101 has eight primary switches Q1–Q8, as opposed to 12 primary switches for conventional interleaving.

Figure 12:
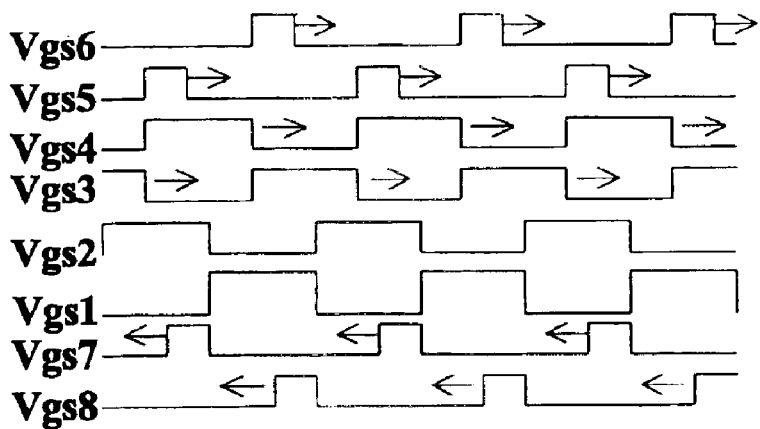
FIG. 12 is a graphic illustration of a possible gate drive scheme for the converter shown in FIG. 11.
Figure 13:
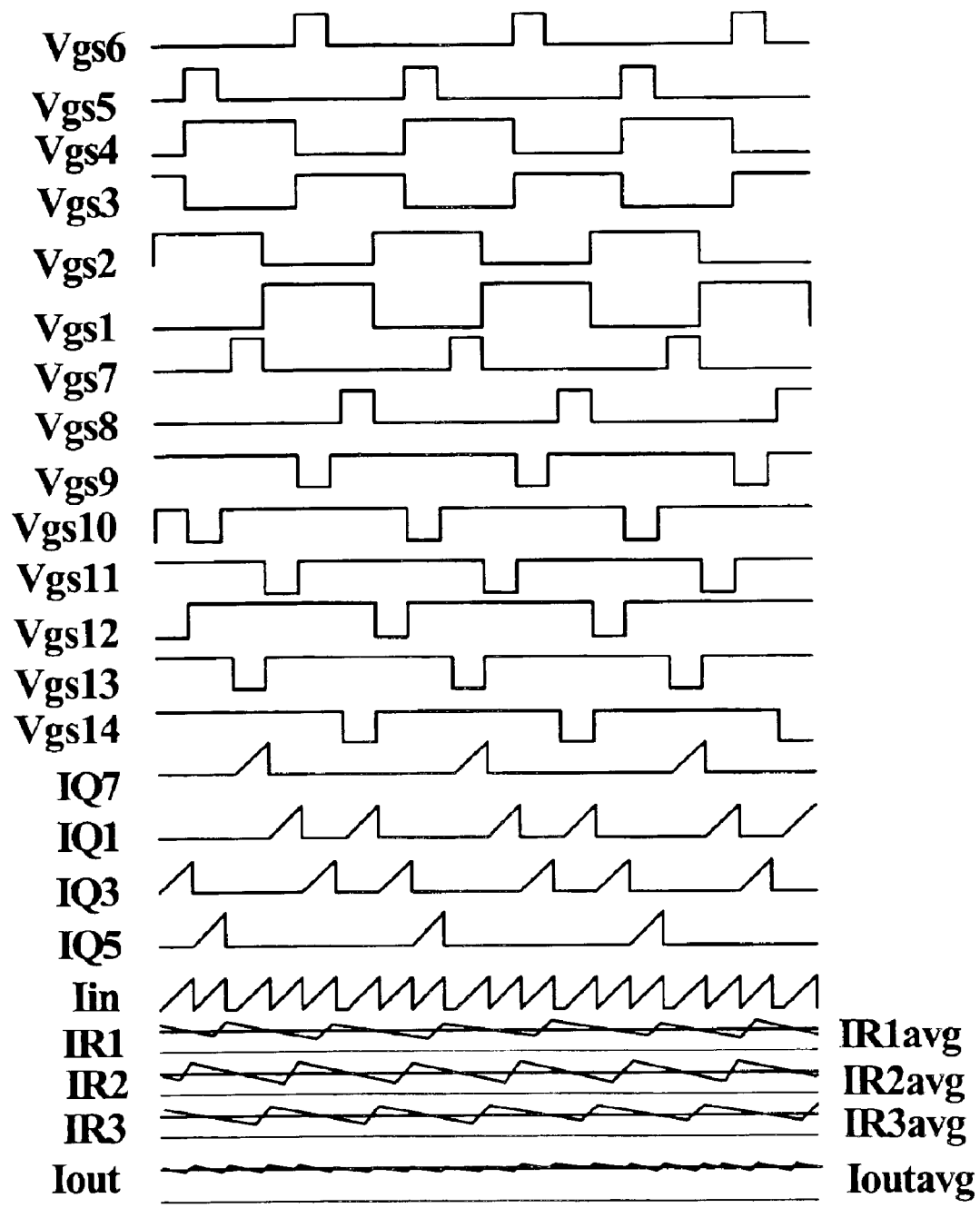
FIG. 13 is a graphic illustration of gate drive signals and input and output current waveforms for the converter of FIG. 11.

Referring to FIG. 12, there is shown a gate drive scheme for the converter 1101, to achieve performance similar to a conventional three-phase interleaved converter. FIG. 13 also shows input current and output current waveforms for the three-phase interleaved full-bridge converter 1101 with shared primary switches.

Q1 and Q2 work out of phase with each other. Q1 is on for the first half switching period and Q2 is on for the next half switching period. Q3 and Q4 work out of phase with each other also. Q3 is on for the first half switching period and Q4 is on for the next half switching period. Q3 and Q4 are phase-shifted with respect to Q1 and Q2. Q5 is turned on when Q4 is turned on. Q6 is turned on when Q3 is turned on.

The duty cycle of Q7 and Q8 are controlled by changing the turn on time. Q7 is turned off when Q2 is turned off. Q8 is turned off when Q1 is turned off It should be noted that for a three-phase interleaved converter when the duty cycle is 33.33%, the smallest input and output current ripple is achieved. The ripple frequency is also increased.

Compared with the two-phase interleaved full-bridge DC converter 601 shown in FIG. 6, the three-phase interleaved full-bridge converter 1101 uses two more primary switches Q7, Q8, and another transformer T3 and 2 secondary switches Q13, Q14. More switches can be added in the primary side and secondary side to form a four-phase shift or more phase shift interleaved full-bridge converter.

Figure 14:
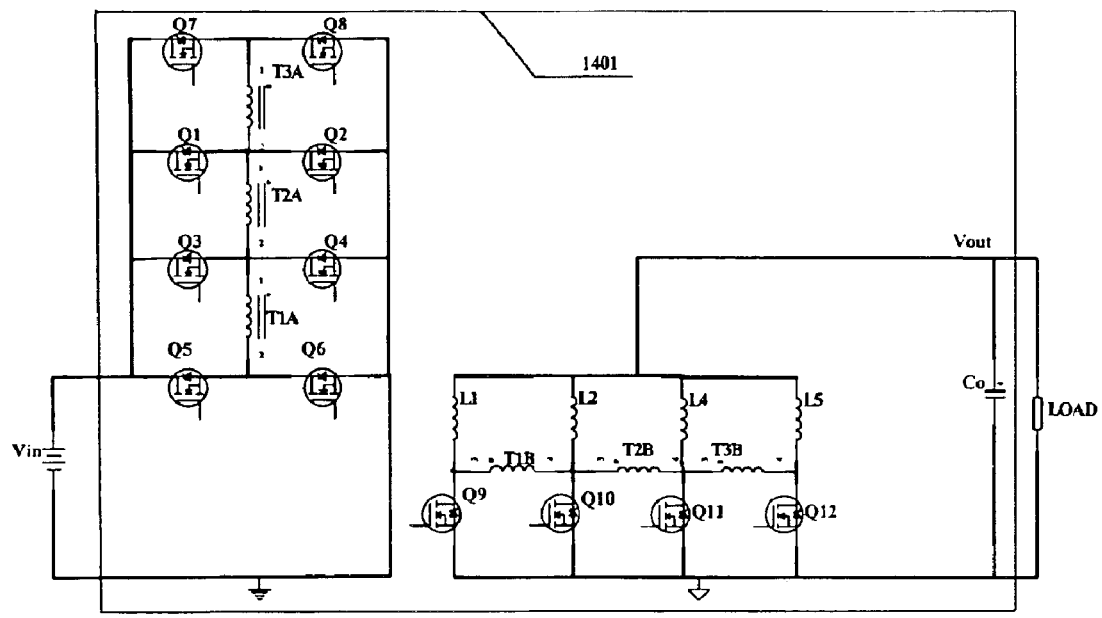
FIG. 14 is a schematic diagram of a three-phase interleaved full-bridge converter with shared primary switch and shared secondary switch in accordance with a preferred embodiment of the present invention.

Referring to FIG. 14, in converter 1401, rectifier switches can also be shared using only four secondary switches Q9–12.

Figure 15:
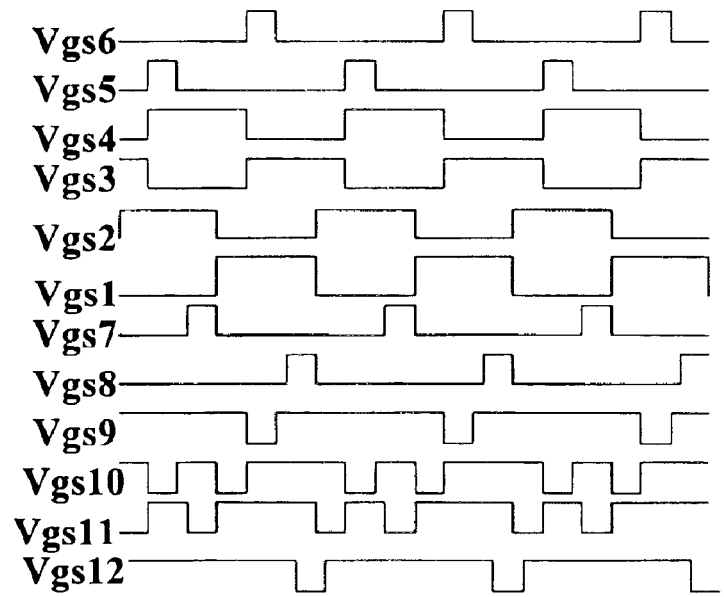
FIG. 15 is a graphic illustration of gate drive signals for the converter of FIG. 14.

FIG. 15 shows one possible implementation of the gate drive signals for the converter 1401 of FIG. 14. In the gate drive waveform, the gate drive signals for primary switches Q1–8 are the same as those without a shared secondary switch (FIG. 11). For synchronous rectifier switching, Q9 is off when Q3 and Q6 are on. Q1 is off when Q4 and Q5 or Q1 and Q4 are on. Q11 is off when Q2 and Q3 or Q7 and Q2 are on. Q12 is off when Q1 and Q8 are on.

Figure 16:
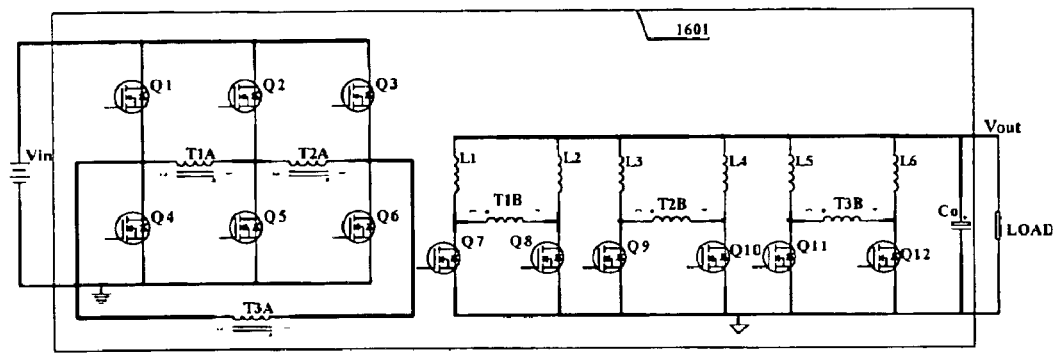
FIG. 16 is a schematic diagram of another three-phase interleaved full-bridge converter with shared primary switch in accordance with a preferred embodiment of the present invention.

Referring to FIG. 16, another three-phase interleaved full-bridge converter 1601 is shown. In this circuit, only six primary switches Q1–6 are used. However, the ripple cancellation effect is not as good as that of converter 1101 shown in FIG. 11.

Figure 17:
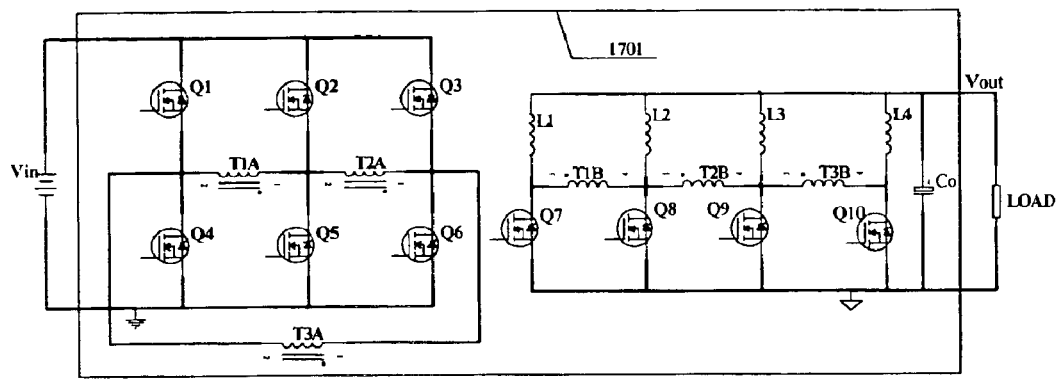
FIG. 17 is a schematic diagram of a three-phase interleaved full-bridge converter with shared primary switch and with shared secondary switch in accordance with a preferred embodiment of the present invention.

Referring to FIG. 17, the rectifier switches can also be shared for the converter 1601 of FIG. 16 as shown in converter 1701.

Several interleaved full-bridge DC converters with reduced numbers of MOSFETs have been described. It should be noted that the same principles can be used to derive other multiple-phase interleaved full-bridge converters that will not otherwise be described herein, but which can be implemented by one skilled in the art using the principles described herein.

Figure 18:
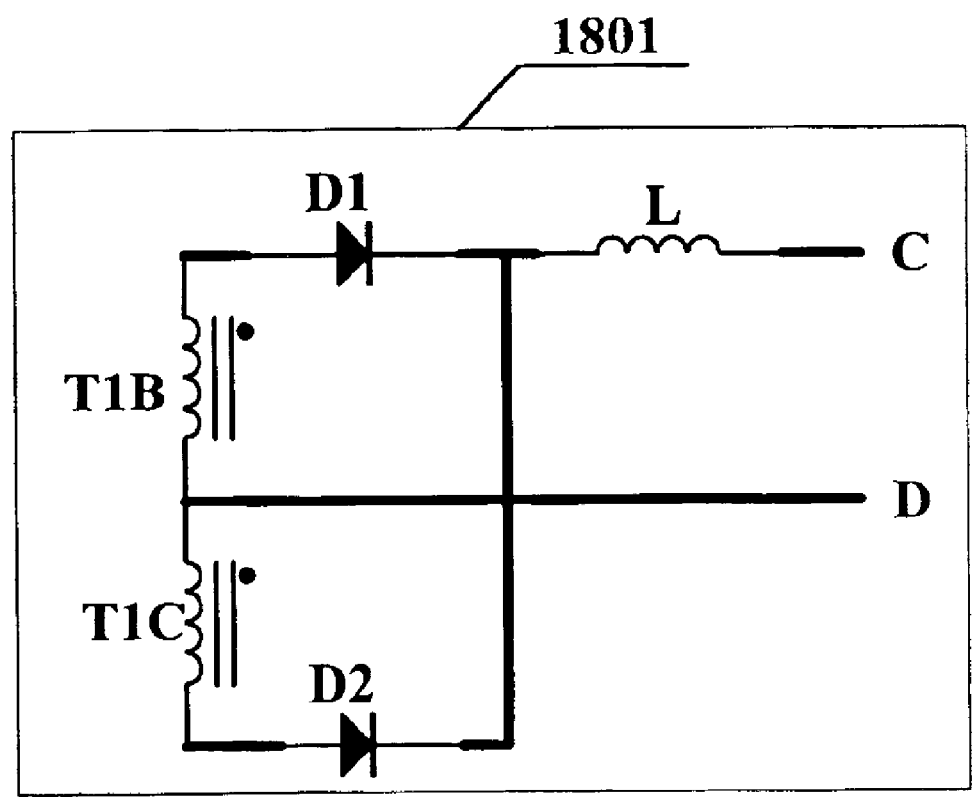
FIG. 18 is a schematic diagram of a rectifier circuit with two windings and two diodes for use in the above converters.
Figure 19:
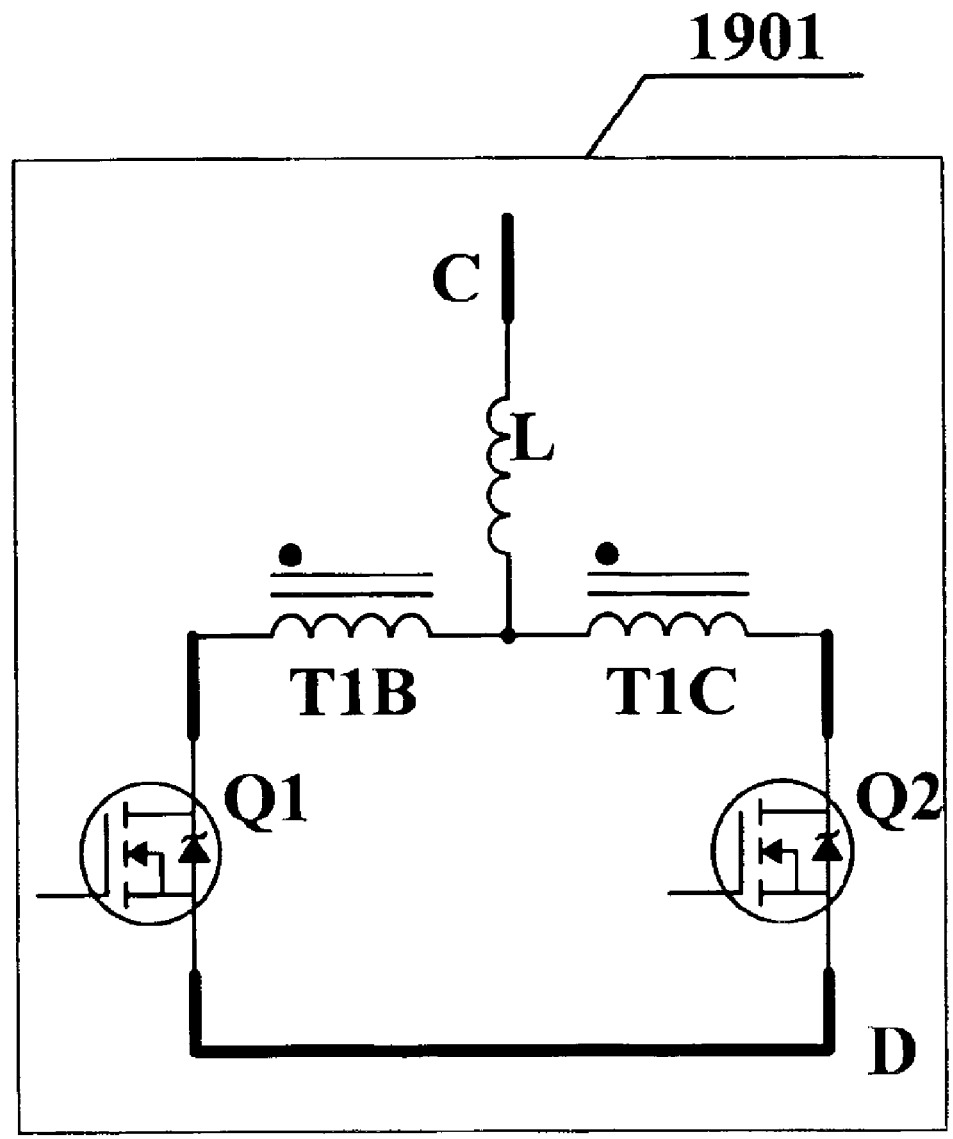
FIG. 19 is a schematic diagram of a rectifier circuit with two windings and synchronous rectifier for use in the above converters.

In the above analysis, only the so-called "current doubler" has been used as an example in the rectifier circuit. In actual implementation, other types of rectifier circuits can also be used and the new interleaved full-bridge converters can be derived in the same way. FIG. 18 shows one example of another rectifier circuit 1801 that may be used. FIG. 19 shows a rectifier circuit 1901 where one diode rectifier in the rectifier circuit of FIG. 18 is replaced by a synchronous rectifier to obtain rectifier circuit.

Figure 20:
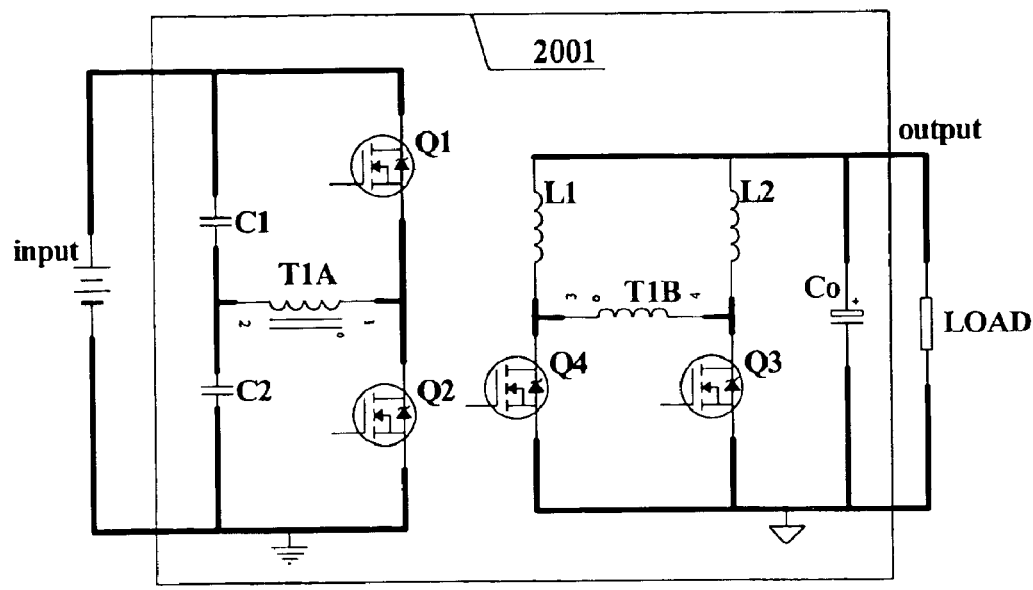
FIG. 20 is a schematic diagram of a half-bridge DC converter of known configuration.

Novel interleaved half-bridge DC converters will now be described. FIG. 20 shows a conventional half-bridge DC converter 2001.

Figure 21:
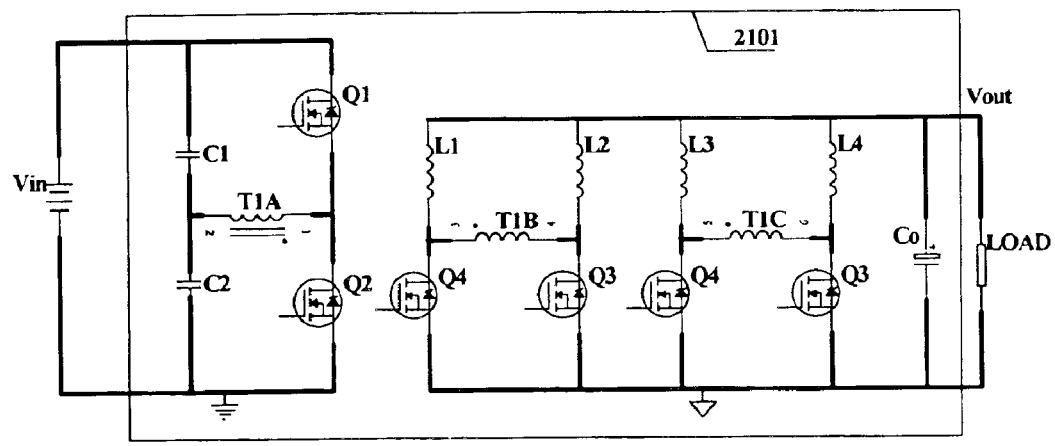
FIG. 21 is a schematic diagram of a half-bridge DC converter with parallel rectifier circuits in accordance with a preferred embodiment of the present invention.

Referring to FIG. 21, two or more rectifier circuits can be connected in parallel at the secondary side in order to reduce the conduction loss of the rectifier circuit, to produce a half-bridge DC converter 2101 with parallel rectifier circuits. In actual implementation, three or more rectifier circuits can be connected in parallel to share the load current. Detailed circuits are not shown in this description, but will be evident to those skilled in the art using the principles described herein.

Figure 22:
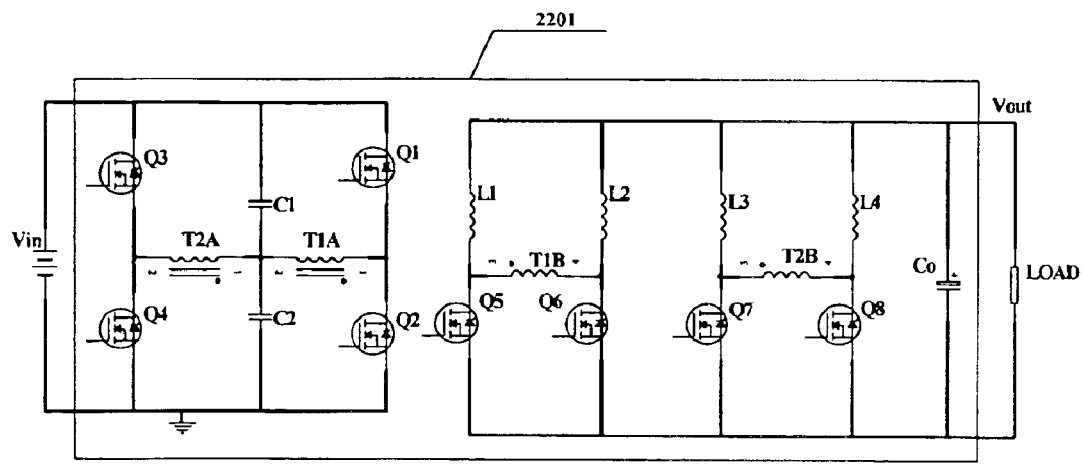
FIG. 22 is a schematic diagram of a two-phase interleaved half-bridge converter with shared primary capacitor in accordance with a preferred embodiment of the present invention.

A conventional two-phase half-bridge DC converter, not shown, using the converter 2001 of FIG. 20, requires four primary MOSFETs and four capacitors. Referring to FIG. 22, the capacitors can be shared and only two capacitors C1, C2 are used. A two-phase interleaved half-bridge DC converter 2201 with shared capacitor is shown. The primary side needs four MOSFETs Q1-Q4 and two capacitors C1, C2. However, the input current ripple can also be significantly reduced.

Figure 23:
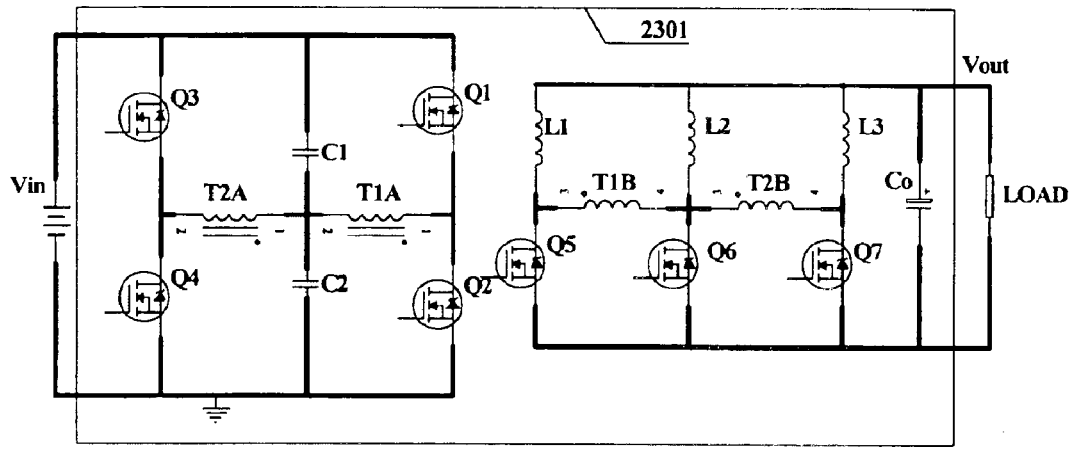
FIG. 23 is a schematic diagram of a two-phase interleaved half-bridge converter with shared secondary switch in accordance with a preferred embodiment of the present invention.

Referring to FIG. 23, a two-phase interleaved half-bridge converter 2301 with shared primary capacitors and shared secondary switches is shown. In this circuit, only three MOSFETs Q1-Q3 are used in the secondary circuit. It should be noted that same principles can be used to derive other multiple-phase interleaved half-bridge converters, which will be evident to those skilled the art using the principles described herein.

It will be understood by those skilled in the art that this description is made with reference to the preferred embodiment and that it is possible to make other embodiments employing the principles of the invention which fall within its spirit and scope as defined by the following claims.

We claim:

1. An isolated DC-DC converter for use with a DC power source having a DC voltage across a first voltage source output and a second voltage source output and with a load, the converter comprising:
   a. an input for accepting the DC voltage, the input having a first voltage input and a second voltage input,
   b. an output electrically isolated from the input for outputting a converted DC voltage, the output having a first voltage output and a second voltage output, c. a primary side circuit connected between the first voltage input and the second voltage input including a first primary winding of a first transformer and an auxiliary section,
d. a plurality of rectifier circuits, each rectifier circuit having a separate secondary winding of the first transformer, the rectifier circuits connected in parallel with one another and with the output, and
e. an output capacitor connected between the first voltage output and the second voltage output and across the rectifier circuit wherein an output converted DC voltage between the first voltage output and the second voltage output has the same polarity as a DC voltage input between the first voltage input and the second voltage input, wherein the auxiliary section is for causing the first transformer to transfer power from the first primary winding to the secondary winding and to operate without saturation, wherein the rectifier circuit is for converting output of the secondary windings into a one-direction waveform and convening the one-direction waveform into a DC voltage, and wherein the output capacitor is for filtering the converted DC voltage.

2. The converter of claim 1, wherein the plurality of rectifier circuits comprises only first and second rectifier circuits.

3. The converter of claim 1, wherein the auxiliary section comprises a first switch connected between a first side of the first primary winding and the first voltage input, a second switch connected between a second side of the first primary winding and the first voltage input, a third switch connected between the first side of the first primary winding and the second voltage output, and a fourth switch connected between the second side of the first primary winding and the second voltage input.

4. The converter of claim 3, wherein each switch has an input for a gate drive signal for controlling the operation of the switch.

5. The converter of claim 4, wherein the gate drive signals repeatedly turn on and turn off the first and fourth switch, as well as turn on and turn off the second and third switch, whereby the transformer can be reset.

6. The converter of claim 1, wherein the auxiliary section comprises a first switch connected between a first side of the first primary winding and the first voltage input, a first capacitor connected between a second side of the first primary winding and the first voltage input, a second switch connected between the first side of the first primary winding and the second voltage input, and a second capacitor connected between the second side of the first primary winding and the second voltage input.

7. The converter of claim 6, wherein each switch has an input for a gate drive signal for controlling the operation of the switch.

8. The converter of claim 6, further comprising gate drive signals adapted to repeatedly turn on and turn off the first switch, and repeatedly turn on and turn off the second switch, whereby the first transformer can be reset from the capacitors.

9. The converter of claim 6, wherein the capacitors are large enough that the voltage across the capacitors will not change significantly during normal operation of the converter.

10. The converter of claim 1, wherein the rectifier circuit further comprises a combination of inductors and switches, wherein the switches are for converting alternating voltage in the secondary windings into pulsating one-direction voltage and the inductors are for converting pulsating one-direction voltage into DC voltage.

11. The converter of claim 1, wherein the rectifier circuit further comprises a combination of inductors and diodes, wherein the diodes are for converting pulsating alternating voltage in the secondary windings into pulsating one-direction voltage and the inductors are for converting pulsating one-direction voltage into DC voltage.

12. The converter of claim 1, wherein the duty cycle of the transformer is between 40 % and 60%.

13. The converter of claim 1, wherein the duty cycle of the transformer is between 40% and 60%.

14. The converter of claim 1, wherein the first input is for accepting a DC potential that is positive when compared to a DC potential for acceptance by the second voltage input.

15. An isolated DC-DC converter for use with a DC power source having a DC voltage across a first voltage source output and a second voltage source output and with a load, the converter comprising:
a. an input for accepting the DC voltage, the input having a first voltage input and a second voltage input,
b. an output electrically isolated from the input for outputting a converted DC voltage, the output having a first voltage output and a second voltage output,
c. a primary side circuit connected between the first voltage input and the second voltage input including a primary winding of each of a plurality of transformers, and an auxiliary section,
d. a rectifier circuit having a secondary winding for each of the plurality of transformers, the rectifier circuit connected in parallel with the output, and
e. an output capacitor connected between the first voltage output and the second voltage output and across the rectifier circuit, wherein an output converted DC voltage between the first voltage output and the second voltage output has the same polarity as a DC voltage input between the first voltage input and the second voltage input, wherein the auxiliary section is for causing the transformers to transfer power from the primary windings to the secondary windings and to operate without saturation, and the auxiliary section includes switches for repeatedly connecting and disconnecting the primary windings from the input, and for resetting the transformers, wherein a plurality of the switches in the auxiliary section are shared between transformers, wherein the rectifier circuit is for converting output of the secondary windings into a one direction waveform and converting the one-direction waveform into a DC voltage, and wherein the output capacitor is for filtering the converted DC voltage.

16. The converter of claim 15, wherein the rectifier circuit further comprises a plurality of switches for performing the conversion of output of the secondary windings into a one-direction waveform.

17. The converter of claim 15, wherein the transformer primary windings of the plurality of transformers are connected one to the next in a ring.

18. The converter of claim 15, wherein the transformer primary windings of the plurality of transformers are connected one to the next in series.

19. The converter of claim 15, wherein the plurality of transformers consists of a first and a second transformer and wherein the primary side primary windings consist of a first primary winding of the first transformer and a second primary winding of the second transformer, and the plurality of switches of the auxiliary section consist of a first switch connected between a first side of the first primary winding and the first voltage input, a second switch connected between a second side of the first primary winding and the first voltage input, a third switch connected between the first side of the first primary winding and the second voltage input, and a fourth switch connected between the second side of the first primary winding and the second voltage input, and a fifth switch connected between the first voltage input and a first side of the second primary winding, and a sixth switch connected between the first side of the second primary winding and the second voltage input, and a second side of the second primary is connected to a side of the first primary winding.

20. The converter of claim 19, wherein the second primary switches have inputs for gate drive signals for operating the second primary winding out of phase with the first primary winding.

21. The converter of claim 15, wherein the plurality of transformers consists of a first, second, and third transformer and wherein the primary side primary windings consist of a first primary winding of the first transformer and a second primary winding of the second transformer and a third primary winding of the third transformer, and the plurality of switches of the auxiliary section consist of a first switch connected between a first side of the first primary winding and the first voltage input, a second switch connected between a second side of the first primary winding and the first voltage input, a third switch connected between the first side of the first primary winding and the second voltage input, and a fourth switch connected between the second side of the first primary winding and the second voltage input, and a fifth switch connected between the first voltage input and a second side of the second primary winding, and a sixth switch connected between the second side of the second primary winding and the second voltage input, and a first side of the second primary winding is connected to a first side of the first primary winding, the third transformer connected between the first side of the first primary winding and the second side of the second primary winding.

22. The converter of claim 16, wherein a plurality of the seitches of the rectifier circuit are shared between the secondary windings of the transformers.

23. An isolated DC-DC converter for usee with a DC power source having a DC voltage across a first voltage source output and a second voltage source output and with a load, the converter comprising:
   a. an input for accepting the DC voltage, the input having a first voltage input and a second voltage input,
   b. an output electrically isolated from the input for outputting a converted DC voltage, the output having a first voltage output and a second voltage output,
   c. a primary side circuit connected between the first voltage output and the second voltage input including a primary winding of each of a plurality of transformers, and an auxilllary section,
   d. a rectifier circuit having a secondary winding for each of the plurality of transformers, the rectifier circuit connected in parallel with the output, and
   e. an output rectifier connected between the first voltage output and the second voltage output and across the rectifier circuit, wherein and output converter DC voltage between the first voltage output and the second voltage output has the same polarity as a DC voltage input between the first voltage input and the second voltage input, wherein the auxiliary section is for causing the transformers to transfer power from the primary windings to the secondary windings and to operate without saturation, and the auxiliary section includes a combination of switches and capacitors for repeatedly connecting and disconnecting the primary windings from the output, and for resetting the transformers, wherein the combination of switches and capacitors in the auxiliary section is shared between transformers, wherein the rectifier circuit is for converting output of the secondary windings into a one-direction waveform and converting the one-direction waveform into a DC voltage, and
   wherein the output capacitor if for filtering the converted DC voltage.

24. The converter of claim 23, wherein the rectifier circit further comprises a plurality a plurality of switches for perforing the conversion of the output of the secondary windings into one-direction voltage.

25. The converter of claim 1, 15 or 23, wherein the primary switch have input for gate drive signals for operating the primary windings out of phase with one another.

26. The converter of claim 1, 15 or 23, wherein the auxiliary section comprises four switches.

27. The converter of claim 26, wherein each switch is MOSFET.

28. The converter of claim 15, OR 23, wherein the rectifier circuit further comprises a first rectifer switch connected between the second voltage output and a first side of a first secondary winding of the secondary windings, a second rectifier switch connected between a second side of the first secondary winding and the second voltage output, a first inductor connected between the first side of the first secondary winding and the first voltage output, and a second inductor connected between the second side of the first secondary winding and the first voltage output.

29. The converter of lcaim 28, wherein each switch has an input for a gate drive signal for controlling the operation of the switch.

30. The converter of claim 28, further comprising gate drive signals adapted to switch the first and second rectifier switches to convert alternating pulsating AC voltage and the first secondary winding into one direction pulsating voltage.

31. The converter of claim 15 or 23, wherein the rectifier circuit further comprises a first rectifier switch connected between the first voltage output and a first side of a first secondary winding of the secondary windings, a second rectifier switch connected between a second side of the first secondary winding and the second voltage output, and a first inductor connected between the first side of the first secondary winding and the first voltage output not in series with the second rectifier switch.

32. The converter of claim 15 or 23, wherein the rectifier circuit further comprises first and second rectifier diodes and a first inductor, and the first diode is connected between a first side of a first secondary winding of the secondary windings and the first inductor, and the inductor is further connected between the first diode and the first voltage output, for forward conduction from the first secondary winding through the inductor, and the second diode is connected between (a) a point between the second side of the first secondary winding and the second voltage output and (b) a point between the first inductor and firs diode, also for forward conduction from the secondary winding through the inductor.

33. The converter of claim 15 or 23, wherein the rectifier circuit further comprises first and second rectifier diodes and a first inductor, and a second side of a first secondary winding of the secondary windings is connected to a first side of a second secondary winding of the secondary windings and the second voltage output, and the first diode is connected between a first side of the first secondary winding and the first inductor, and the inductor is further connected between the first diode and the first voltage output, for forward conduction from the secondary winding through the inductor, and the second diode is connected between (a) the second side of the second secondary winding and (b) a point between the first inductor and first diode, also for forward conduction from the secondary winding through the inductor.

34. The converter of claim 15 or 23, wherein the rectifier circuit further comprises first and second rectifier switches and a first inductor, and a second side of a first secondary winding of the secondary windings is connected to a first side of a second secondary winding of the secondary windings and the inductor which is further connected to the first voltage output, and the first rectifier switch is connected between a first side of the first secondary winding and the second voltage output, and the second rectifier switch is connected between a second side of the second secondary winding and the second voltage output.

35. The converter of claim 28, wherein the first and second rectifier switches, the first secondary winding and the first and second inductors are comprised within a first rectifier section, and the rectifier circuit further comprises a second rectifier section similar to the first rectifier section, and the first and second rectifier sections are connected in parallel with one another and with the output capacitor and the output.

36. The converter of claim 33, wherein the first and second diodes, the first secondary and second secondary windings and the inductor are comprises within a first rectifier section, and the rectifier circuit further comprises a second rectifier section similar to the first rectifier section, and the first and second rectifier sections are connected in parallel with one another and with the output capacitor and the output.

37. The converter of claim 34, wherein the first and second rectifier switches, the first secondary and second secondary windings and the inductor are comprised within a first rectifier section, and the rectifier circuit further comprises a second rectifier section similar to the first rectifier section, and the first and second rectifier sections are connected in parallel with one another and with the output capacitor and the output.

38. The converter of claim 1, 15 or 23, wherein the input voltage is approximately 48 volts DC, and the output voltage is within a range of 0.8 volts DC to 1.6 volts DC.

39. The converter of claim 1, 15 or 23, wherein the input voltage is approximately 48 volts DC, and the output voltage is approximately 24 volts DC.

40. The converter of claim 1, 15 or 23, wherein the input voltage is approximately 48 volts DC, and the output voltage is approximately 12 volts DC.

41. The converter of claim 1, 15 or 23, wherein the input voltage is approximately 400 volts DC, and the output voltage is approximately 48 volts DC.

42. The converter of claim 15 or 23, wherein the input voltage is approximately 48 volts DC, and the output voltage is within a range of 0.8 volts DC to 5 volts DC.

43. The converter of claim 15 or 23, wherein the converter has only two transformers, and the duty cycle of each transformer is approximately 40% and 60%.

44. The converter of claim 15 or 23, wherein the converter has only two transformers, and the duty cycle of each transformer is approximately 50%.

45. The converter of claim 15 or 23, wherein the converter has only three transformers, and the duty cycle of each transformer is approximately 33 –1/3 %.

46. A method for operating a converter of claim 1, 15 or 23 comprising the steps of:
  driving the auxiliary section to cause the first transformer to transfer power from the first primary winding to the secondary windings, while the same time driving the auxiliary section to cause the transformer to operate without saturation.

47. The converter of claim 24, wherein a plurality of the switches of the rectifier circuit are shared between the secondary windings of the transformers.

48. The converter of claim 23 wherein the transformer primary windings of the plurality of transformers are connected one to the next in the ring.

49. The converter of claim 23 wherein the transformer primary windings of the plurality of transformers are connected on to the next in series.

50. An isolated DC-DC converter for use with a DC power source having a DC voltage across a first voltage source output and a second voltage source output and with a load, the converter comprising:
  a. an input for accepting the DC voltage, the input having a first voltage input and a second voltage input,
  b. an output electrically isolated from the input for outputtin a converted DC voltage, the output having a first voltage output and a second voltage output,
  c. a primary side circuit connected between the first voltage input and the second voltage input including a primary winding of each of a plurality of transformers, and an auxiliary section,
  d. a rectifier circuit having a secondary winding for each of the plurality of transfoermers, the rectifier circuit connected in parallel with the output, and
  e. an output capacitor connected between the first voltage output and the second voltage output and across the rectifier circuit,
  wherein an output converted DC voltage between the first voltage output and the second voltage output has the same polarity as a DC voltage input between the first voltage input and the second voltage input,
  wherein the auxiliary section is for causing the transformers to transfer power from primary windings to the secondary windings and to operate without saturation, and the auxiliary section includes switches for repeatedly connecting and disconnecting the primary windings from the input, and for resetting the transformers wherein a plurality of the switches in the auxiliary section are shared between transformers,
  wherein the rectifier circuit is for converting output of the secondary windings into a one direction waveform and converting the one-direction waveform into a DC voltage, and
  wherein the output capacitor is for filtering the converted DC voltage and wherein the plurality of transformers consists of a first, second, and a third transformer and wherein the primary side primary windings consists of a first primary winding of the first transformer and a second primary winding of the second transformer and a third primary winding of the third transformer, and the plurality of switches of the auxiliary section consists of a first switch connected between a first side of the first primary winding and the first voltage inoput, a second switch connected between a second side of the first primary winding and the first voltage input, a third switch connected between the first side of the first primary winding and the second voltage input, and a fourth switch connected between the second side of the first primary winding and the second voltage input, and a fifth switch connected between the first voltage input and a second side of the primary windings, and a sixth switch connected between the second side of the second primary winding and the second voltage input, and a first side of the second primary winding is connected to a second side of the first primary winding, a first side of the third primary winding connected to the second side of the second primary winding, and a seventh switch connected between a second side of the third primary winding and the first voltage input, and an eighth switch connected between the second side of the third primary winding and the second voltage input.

51. The converter of claim 50, wherein the primary switches have inputs for gate drive signals for operating the primary windings out of phase with one another, and no additional drive components are added for the third primary.

52. An isolated DC-DC converter for use with a DC power source having a DC voltage across a first voltage source output and a second voltage source output and with a load, the converter comprising:
   a. an input for accepting the DC voltage, the input having a first voltage input and a second voltage input,
   b. an output electrically isolated from the input for outputting a converted DC voltage, the output having a first voltage output and a second voltage output,
   c. a primary side circuit connected between the first voltage input and the second voltage input incuding a primary winding of each of a plurality of transformers, and an auxiliary section,
   d. a rectifier circuit having a secondary winding for each of the plurality of transformers, the rectifier circuit in parallel with the output, and
   e. an output capacitor connected between the first voltage output and the second voltage output and across the rectifier circuit,
   wherein an output converted DC voltage between the first voltage output and the second voltage output has the same polarity as a DC voltage input between the first voltage input and the second voltage input,
   wherein the auxiliary section is for causing the transformers to transfer power from the primary windings to the secondary windings and to operate without saturation,
   wherein the rectifier circuit is converting output of the secondary windings into a one direction waveform and converting the one-direction waveform into a DC voltage,
   wherein the rectifier circuit further comprises a plurality of switches for performing the conversion of output of the secondary windings into a one- direction waveform, and wherein a plurality of the switches of the rectifier circuit are shared between the secondary windings of the transformers, and wherein the output capacitor is for filtering the converted DC voltage.

* * * * *